T. A. EDMISON.
Fifth Wheel.
No. 69,194.  Patented Sept. 24, 1867.
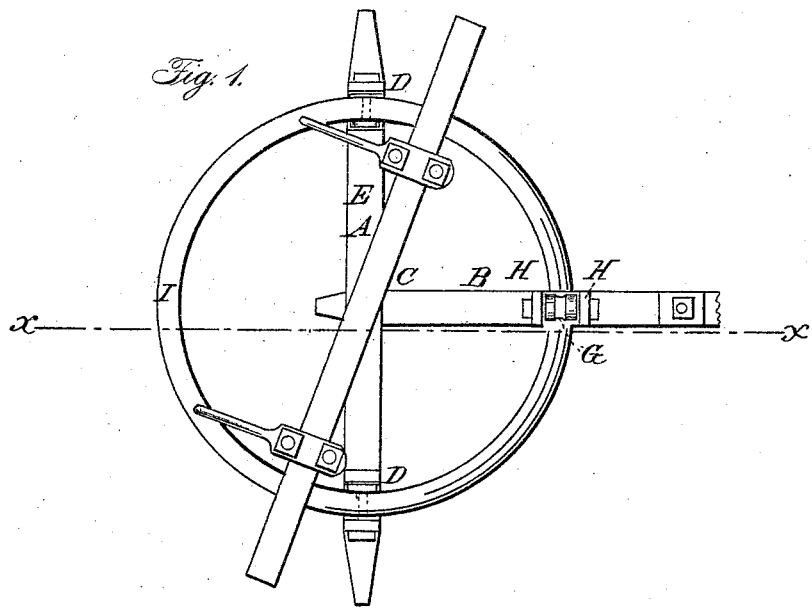
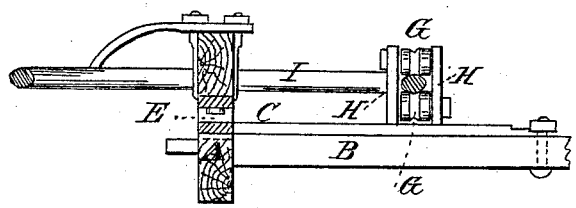
Witnesses:
Inventor:

United States Patent Office.

THOMAS A. EDMISON, OF LAKEPORT, MICHIGAN.

Letters Patent No. 69,194, dated September 24, 1867.

IMPROVED TURNING-PLATE FOR CARRIAGES.

*The Schedule referred to in these Letters Patent and making part of the same.*

TO ALL WHOM IT MAY CONCERN:

Be it known that I, THOMAS A. EDMISON, of Lakeport, in the county of St. Clair, and State of Michigan, have invented a new and useful Improvement in Carriages, &c.; and I do hereby declare that the following is a full, clear, and exact description thereof, which will enable others skilled in the art to make and use the same, reference being had to the accompanying drawings, forming part of this specification.

The present invention relates to the turning-plate of carriages and other vehicles, and consists in the application to the front axle-tree, and to such end of the reach-pole of a T-shaped plate or bar, provided with rollers for the turning-ring or plate to run upon, and be confined and held from becoming disengaged, as and in a manner to be now described, reference being had to the accompanying plate of drawings, in which—

Figure 1 is a plan or top view, and

Figure 2 a vertical section taken in the plane of the line $x\ x$, fig. 1.

Similar letters of reference indicate corresponding parts.

A in the drawings represents the front axle to a carriage or other vehicle, B the reach-pole at the end fastened to the axle A; C a T-shaped plate applied to reach-pole B and axle A. This T plate is provided with a friction-roller, D, at the outer end of its cross-arm E, and at the end to its tail piece F with two friction-rollers, G, arranged the one above the other, and hung within suitable standards, H, fixed to the reach-pole. On the rollers D, and between the two rollers G, the turn-plate or ring I is arranged to move, and by the two rollers it is confined in place and held from becoming detached from the axle and reach-pole, while at the same time it is free to turn around therein, as may be desired.

I claim as new, and desire to secure by Letters Patent—

The plate C with its rollers, in combination with the turning-plate or ring of a vehicle, substantially as and for the purpose described.

The above specification of my invention signed by me this 6th day of July, 1867.

THOMAS A. EDMISON.

Witnesses:
EBER LEWIS,
LAWRENCE KILGALLIN.